L. HAYNE.
DETACHABLE CRANK HANDLE.
APPLICATION FILED MAY 14, 1910.
1,006,086.
Patented Oct. 17, 1911.
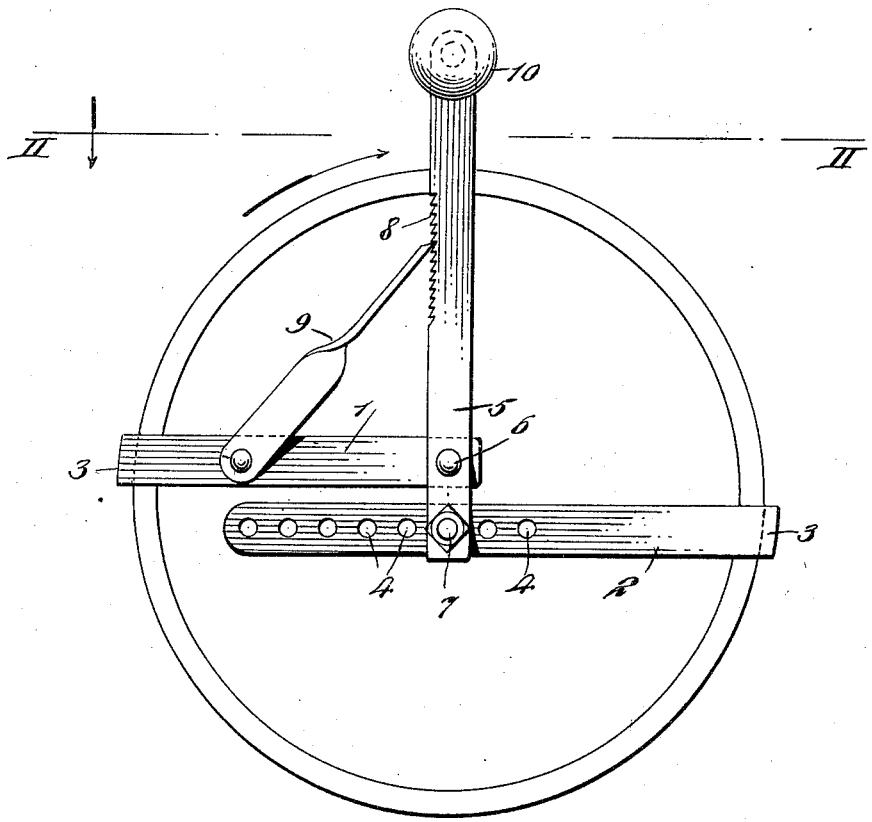
Fig. 1.
Fig. 2.
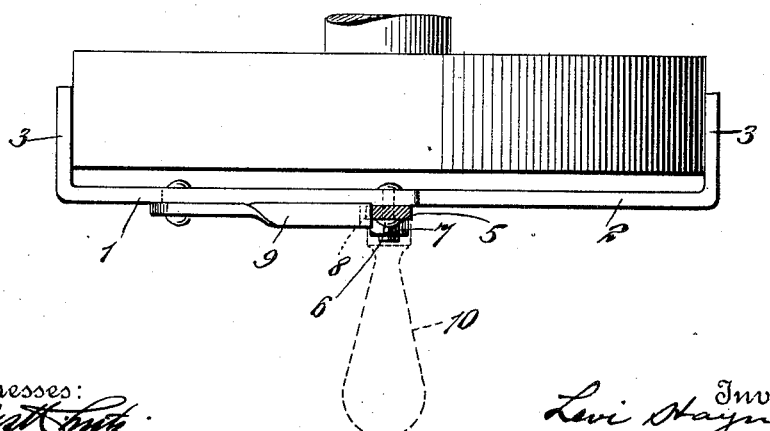
Witnesses:
Inventor
Levi Hayne
By his Attorneys
Criswell & Criswell

UNITED STATES PATENT OFFICE.

LEVI HAYNE, OF SCHENECTADY, NEW YORK, ASSIGNOR TO PIKE MANUFACTURING COMPANY, OF PIKE, NEW HAMPSHIRE, A CORPORATION OF NEW HAMPSHIRE.

DETACHABLE CRANK-HANDLE.

1,006,086.               Specification of Letters Patent.     Patented Oct. 17, 1911.

Application filed May 14, 1910. Serial No. 561,317.

*To all whom it may concern:*

Be it known that I, LEVI HAYNE, a citizen of the United States, and a resident of Schenectady, county of Schenectady, and State of New York, have invented certain new and useful Improvements in Detachable Crank-Handles, of which the following is a full, clear, and exact description.

The main object of this invention is to provide a detachable crank handle which may be readily attached to and detached from a transporting wheel of a lawn mower in order that the wheels, and consequently the cutter shaft, may be rotated to enable the operator to sharpen the cutter blades.

Another object of the invention is to provide such a device which may be readily and quickly attached to a wheel without the necessity of using attaching or clamping screws.

Another object of the invention is to provide such a device so constructed that it may be readily and quickly applied to a lawn mower wheel, and when in position the strain applied to the handle to rotate the wheel will result in the clamp being more firmly bound to the wheel.

With these and other objects in view, the invention will be hereinafter more particularly described with reference to the accompanying drawings, which form a part of this specification, and will then be pointed out in the claims at the end of the description.

In the drawings, Figure 1 is a side elevation of a wheel with the detachable crank in position thereon; and Fig. 2 a plan view of the device applied to a wheel, the crank arm being shown in section, said section being taken on the line II—II of Fig. 1.

Referring to the various parts by numerals, 1 and 2 designate two parallel clamping members which are extended in opposite directions, each being provided on its outer end with a clamping arm 3. These arms are adapted to engage the face of the transporting wheel when the device is applied to a lawn mower. It will, of course, be understood that the device may be applied to any form of disk or wheel, and I desire it understood that I do not wish to be limited to the use of the device on a lawn mower. One of the clamping members, as 2, is provided near its inner end with a series of apertures 4 for a purpose which will hereinafter appear. To the inner end of the clamping member 1 is pivoted a crank arm 5, as indicated at 6 in Fig. 1. The crank arm extends below said pivot and is connected at its lower end to the clamping member 2 by means of the bolt 7, said bolt extending through one of the openings 4. The crank arm 5 is provided along one of its edges with ratchet teeth 8 which are adapted to be engaged by an upwardly-extending pawl 9, the lower end of said pawl being pivoted to the clamping member 1.

The device is placed on a wheel in such a position that the center of the wheel is midway between the pivot 6 and the bolt 7. By this arrangement, the clamping member 1 is above the center of the wheel, and the clamping member 2 is below said center, thus preventing the bodily movement of the clamping device from the wheel. With the clamping members arranged as described, the crank arm is moved in the direction indicated by the arrow in Fig. 1, and the locking dog 9 is adapted to bear on the ratchet teeth 8. The movement of the crank arm draws the clamping members inwardly to the periphery of the wheel, and when the locking dog is engaged in the teeth of the crank handle, the said two clamping members are locked in engagement with the wheel. It will, therefore, be seen that in applying this device to a wheel, it is only necessary to adjust the clamping member 2, so that the two clamping members will be on opposite sides of the center of the wheel, and to bring the locking pawl in engagement with the ratchet teeth on the crank handle. The strain now applied on the crank arm to rotate the wheel will cause the two members of the clamping device to grip the wheel, on opposite sides of the center thereof, and the locking pawl will lock the handle and hold the clamping members in position against the wheel.

A suitable handle 10 is connected to the outer end of the crank arm 5.

By means of the series of perforations in the clamping member 2, said member may be adjusted to adapt the device on wheels of different diameters. It is manifest that any suitable means for varying the length of one or both of the clamping members may be employed.

It will thus be seen that I provide a very simple device which may be readily connected to a transporting wheel of a lawn mower in order to provide means for rotating said wheels and the mower shaft when the mower is suspended above ground and it is desired to rotate the mower knives for the purpose of grinding them.

This device is particularly well adapted for use in connection with the lawn mower sharpening device shown in my pending application for patent, filed March 31, 1910, Serial No. 552,644, and covering certain improvements in devices for sharpening lawn mower knives.

Having thus described my invention, I claim as new and desire to secure by Letters Patent:—

1. A detachable crank handle comprising a pair of clamping members arranged side by side and extending in opposite directions, a crank arm pivoted to both of said member to swing in a plane parallel therewith on pivots extending transversely through said members and arm, and a locking means to lock said clamping arm to hold the clamping members in their clamped position.

2. A detachable crank handle comprising a pair of clamping members arranged side by side extending in opposite directions, a crank arm pivoted to both of said members on pivots extending transversely through said members and arm and adapted to swing in a plane parallel therewith, a series of ratchet teeth formed on said crank arm, and a locking dog carried by one of said members adapted to engage said teeth.

3. A detachable crank handle comprising a pair of clamping members arranged parallel and extending in opposite directions, each of said members being formed with a clamping arm, a crank arm pivoted to the inner end of one clamping member to swing in a plane parallel therewith on pivots extending transversely through said members and arm and adjustably connected to the inner end of the other clamping member, and a locking means adapted to engage the crank arm and lock the two locking members in their clamped position.

4. A detachable crank handle comprising two parallel clamping members extending in opposite directions, each of said members being provided on its outer end with a clamping arm, a crank arm pivoted to one of said members and detachably connected to the other member, a locking dog carried by one of said members and adapted to engage a series of ratchet teeth formed on the crank arm to lock the crank handle to the wheel.

5. A detachable crank device, comprising a pair of bars, a member connected with each of the bars to support them in proximity, the bars having clamping means at their opposite extremities, said connected member being movably connected with each of the bars whereby the three members lie in planes substantially parallel, each of said bars and said member adapted to move in said parallel planes, and a locking member pivoted to one of the bars of the connecting member and adapted to contact with said member whereby said bars and member are locked against movement.

6. A detachable crank device, comprising a pair of bars, a member connected with each of the bars to support them in proximity, the bars having clamping means at their opposite extremities, said connected member being movably connected with each of the bars whereby the three members lie in substantially parallel planes and movable in said planes, and a locking member adjustably connected to one of the bars of the connecting member and adapted to engage said member to lock the three members against movement.

This specification signed and witnessed this 10th day of May A. D. 1910.

LEVI HAYNE.

Witnesses:
L. I. MAYER,
LESTER C. TAYLOR.

Copies of this patent may be obtained for five cents each, by addressing the "Commissioner of Patents, Washington, D. C."